United States Patent Office 3,274,367
Patented Sept. 20, 1966

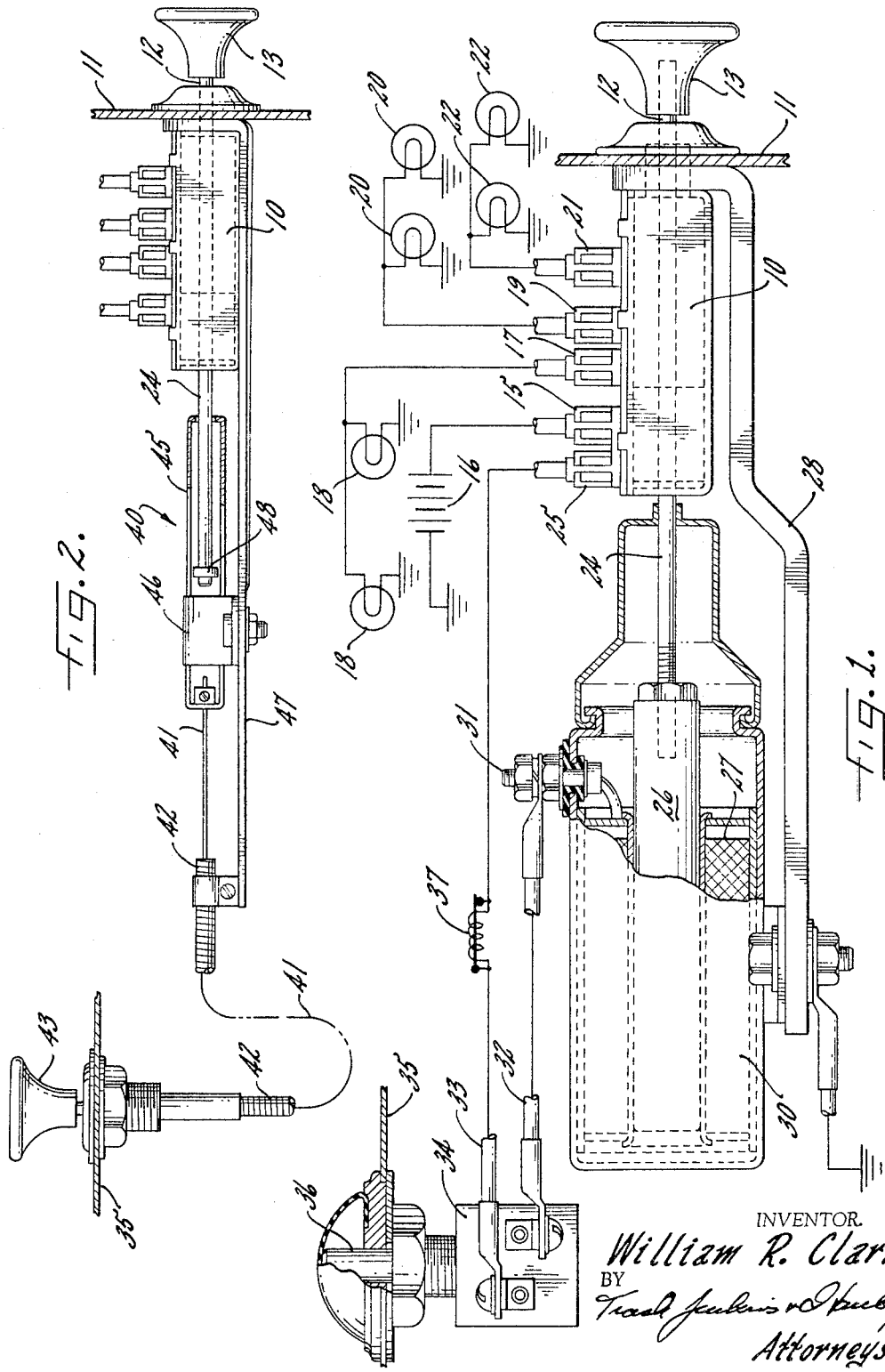

3,274,367
AUTOMOBILE LIGHT SWITCH
William R. Clark, 10800 Cumberland Road,
Noblesville, Ind.
Filed July 6, 1964, Ser. No. 380,229
7 Claims. (Cl. 200—161)

This invention relates to control means for the headlights and other related lights of an automobile, and more particularly to a control means through which the lights may be turned off from outside the automobile if the driver, upon leaving the car with the lights turned on, locks the doors and thereby prevents access to the conventional control switch. Through the use of this invention, it is possible for the driver or a passer-by, seeing the car parked with lights on, to turn them off without the necessity for opening a door of the car.

In carrying out the invention in its preferred form, I provide means by which the conventional light-control switch can be operated from outside the car to open, but not to close, any of the light circuits. In most present-day automobiles, the light switch is mounted on the instrument panel and embodies a control member in the form of a rod slidable longitudinally of itself and perpendicular to the instrument panel. From its forward position, in which all light circuits are open, such rod can be moved rearwardly in steps to close the light circuits selectively. For the purpose of controlling the switch from outside the automobile, this rod may be extended forwardly and operatively connected to a reciprocable member adapted to be moved forwardly by means actuatable from outside the automobile body. In one form of the invention, illustrated hereinafter, the reciprocable member is connected to the core of a solenoid adapted, when energized, to draw the core and switch rod forwardly. A normally open switch, arranged to be closed momentarily from a point outside the automobile, controls energization. In another form of the invention, the control member of the switch is connected through a lost motion connection to a Bowden wire extending to an operating member accessible from outside the car. By virtue of lost motion connection, the Bowden wire will not interfere with normal operation of the switch and can be operated only to open the switch.

Further objects and features of the invention will become apparent from the more detailed description which follows and from the accompanying drawing in which:

FIG. 1 is an elevational view, partially in section, showing an electrical switch operating mechanism, and FIG. 2 is a view similar to FIG. 1 showing a Bowden wire for operating the light switch.

In the common form of present day automobile, the light switch 10 is mounted on the instrument panel 11 of the car and embodies a longitudinally slidable control rod 12 provided at its rear end with an operating knob 13 by means of which it can be reciprocated to control the automobile lights. As shown, the switch comprises a terminal 15 for connection to the ungrounded terminal of the conventional battery 16, a second terminal 17 for inclusion in a circuit with parking lights 18, a third terminal 19 for connection to tail lights 20, and a fourth terminal 21 for connection to the headlights 22. In the forward position of the control rod 12, the switch is open and all lights are turned off. Rearward movement of the control rod to an intermediate position will connect the battery 16 to the parking lights 18 and tail lights 20, while further movement into the extreme rearward position will connect the battery to the tail lights 20 and headlights 22.

A convenient way of incorporating my invention in an automobile involves modifying the switch just described by extending the control rod 12 forwardly through the switch housing, as indicated at 24. If desired, the switch may also be provided with an extra terminal 25 electrically connected to the battery terminal 15. In the arrangement shown in FIG. 1, the forwardly projecting end 24 of the control rod 12 is fixedly secured to the core 26 of an associated solenoid 27. Such solenoid is mounted in line with the switch 10, conveniently on a bracket 28 secured to the instrument panel 11 by the same means employed to mount the switch. The solenoid may be enclosed in a housing 30 and has one end grounded, conviently to the bracket 28 and the other end connected to a binding post 31 mounted on but insulated from the housing 30.

The binding post 31 is connected to the ungrounded terminal of the battery through conductors 32 and 33 and a normally open switch 34 arranged to be momentarily closed from outside the automobile body. As shown, the switch 34 is mounted on the cowl 35 of the automobile and has an operating member in the form of a push button 36, preferably weatherprooofed, by depression of which the switch 34 can be momentarily closed. While the switch 34 and its operating member 36 can be mounted in any position for operation from outside the automobile, I prefer to mount it in a prominent location, such as centrally of the cowl 35.

With the switch 34 open, as it normally is, the solenoid 27 is deenergized and the light switch can be operated in normal manner to control the various light circuits as desired. Movement of the switch control rod 12 into its intermediate or rearward position to turn on lights involves withdrawing the core 26 from the solenoid 27. As a result, if the operator leaves the automobile with the lights turned on, energization of the solenoid by momentary depression of the push button 36 will energize the solenoid and cause the core 26 and rod 12 to move forwardly and open the switch 10. If desired, I may include in one or the other of the conductors 32 and 33 an overload switch 37 adapted to open and prevent draining of the battery should the solenoid remain energized for an unduly long period of time.

In the mechanical switch control illustrated in FIG. 2, the control rod 12 of the conventional light switch 10 is again extended forwardly as indicated at 24. In this arrangement, the forward control rod end 24 is connected, through a lost motion connection 40, to a Bowden wire 41 which extends through the conventional sheath 42 to an operating knob 43 supported exteriorly of the automobile body. As in the case of the device of FIG. 1, the operating knob 43 may be mounted in a central location on the cowl 35 of the automobile or in any other convenient position.

The lost motion connection 40 shown in FIG. 2 comprises a slide 45 slidably supported in a guide 46 for longitudinal movement in line with the switch rod 12. Conveniently, the guide 46 is carried by a bracket 47 secured to the instrument panel 11 in common with the switch 10. The front end of the slide 45 is operatively connected to the Bowden wire 41, while its rear end slidably receives the extension 24 of the switch rod 12. Within the slide, the extension 24 is provided with an abutment 48 engageable with the rear end of the slide to limit rearward movement of the switch rod 12 relative to the slide.

In the condition shown in FIG. 2, the switch rod 12 is in its forward position and the switch 10 is therefore open, the Bowden wire knob is retracted, and the slide 45 is at the rearward limit of its movement in the guide 46. The abutment 48 is so located on the rod extension 24 that, in the condition shown in FIG. 2, movement of the rod 12 to its rearmost position will bring the abutment into contact with or close proximity to the rear end of the slide 45. Thus, the switch rod 12 can be moved into its intermediate position, to turn on the parking lights, or into its rearmost position, to turn on the headlights, without interference from the slide. The extent of possible forward movement of the slide from the position shown in FIG. 2 is equal to at least the range of movement of the switch rod 10. Accordingly, if the automobile is left with either set of lights turned on, withdrawal of the Bowden wire knob 43 and consequent forward movement of the slide 45 will cause the rear end of the slide to engage the abutment 48 and pull the rod 12 forwardly to open all light circuits. The lost motion provided between the abutment 48 and the rear end of the slide 45 prevents subsequent depression of the knob 43 from closing the light switch 10, as such depression would merely move the slide rearwardly without displacing the rod 12. Should the Bowden wire knob 43 be left in withdrawn position, the slide 45 would remain advanced; but upon the first switch closing movement of the control rod 12, the slide 45 would be drawn rearwardly and the knob 43 retracted.

It is to be noted that in both embodiments of the invention above described there is no modification of the light circuits or of the connection of the conventional light switch therein, nor is operation of the light switch in normal manner interfered with.

I claim:

1. In an automobile having a closed body and exterior lights controlled by a switch located within the automobile body and embodying a main reciprocable control member having first and second end portions projecting in opposite directions from a switch housing, said first end portion being within the automobile body to permit the control member to be moved between a first position in which the switch turns the lights off and a second position in which it turns the lights on, the combination with said main control member of a movable auxiliary control member having a portion located outside the automobile body, and means operatively connected to the second end portion of said main control member and actuatable by movement of said auxiliary control member for moving said main control member from its second to its first position, said means being inoperative to move the main control member from its first to its second position.

2. The invention set forth in claim 1 with the addition that said means comprises a solenoid having a movable core secured to the second end portion of said main control member in such position relative thereto that movement of said main control member from its first to its second position withdraws the core from the solenoid, said means further including a normally open switch arranged to be momentarily closed by operation of said auxiliary control member and operating, when closed, to energize said solenoid.

3. The invention set forth in claim 2 with the addition of an overload switch in circuit with said solenoid.

4. The invention set for in claim 1 with the addition that said means comprises a force transmitting, lost motion connection between the main and auxiliary control members.

5. In an automobile having a closed body and exterior lights controlled by a switch embodying a main control member accessible for operation within the body of the automobile and movable between a first position in which the lights are turned off and a second position in which the lights are turned on, the combination with said main control member of means including an auxiliary control member having a portion located outside the automobile body for moving said main control member from its second to its first position, said means being inoperative to move the main control member from its first to its second position.

6. The invention set forth in claim 5 with the addition that said means includes a Bowden wire connected at one end to said auxiliary control member and having at its other end a lost-motion connection to the main control member.

7. The invention set forth in claim 5 with the addition that said means comprises a solenoid and, in circuit therewith, a normally open switch adapted to be closed by operation of said auxiliary control member, said solenoid having an associated core connected to the main control member to be withdrawn from the solenoid by movement of the main control member from its first to its second position.

References Cited by the Examiner

UNITED STATES PATENTS 2,863,013   12/1958   Brown _____ 200—61.54 X

ROBERT K. SCHAEFER, *Primary Examiner.*

KATHLEEN H. CLAFFY, *Examiner.*

H. HOHAUSER, *Assistant Examiner.*